D. W. McLEAN.
CAR MOVING DEVICE.
APPLICATION FILED MAR. 1, 1919.
1,323,601.
Patented Dec. 2, 1919.
2 SHEETS—SHEET 1.
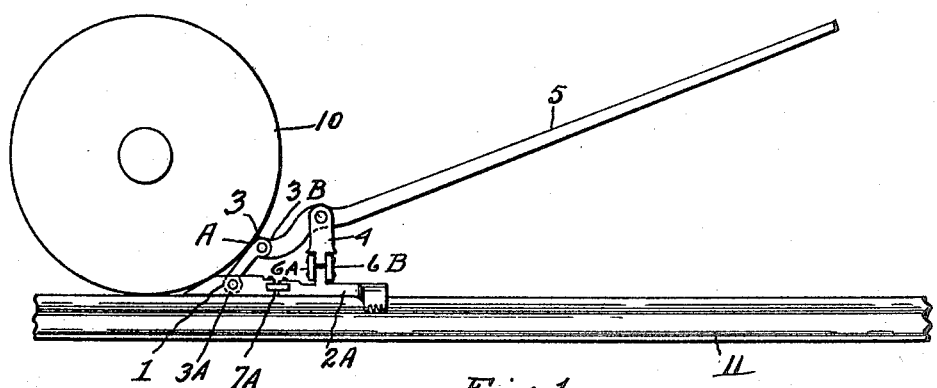
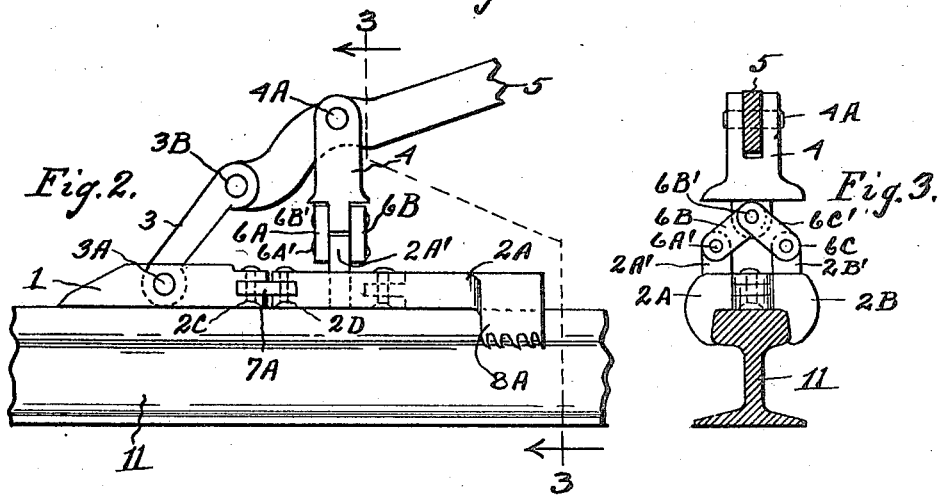
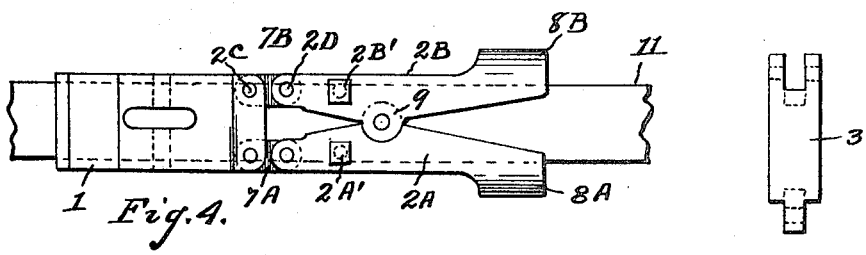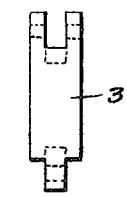
INVENTOR.
Daniel W. McLean.
BY
Ralzemond A. Parker
His ATTORNEY.

D. W. McLEAN.
CAR MOVING DEVICE.
APPLICATION FILED MAR. 1, 1919.

1,323,601.

Patented Dec. 2, 1919.
2 SHEETS—SHEET 2.

INVENTOR
DANIEL W. McLEAN.
BY
Ralzemond A. Parker
HIS ATTORNEY.

UNITED STATES PATENT OFFICE.

DANIEL W. McLEAN, OF HIGHLAND PARK, MICHIGAN, ASSIGNOR OF ONE-HALF TO FRED W. KANDT, OF DETROIT, MICHIGAN.

CAR-MOVING DEVICE.

1,323,601.     Specification of Letters Patent.     Patented Dec. 2, 1919.

Application filed March 1, 1919. Serial No. 279,981.

*To all whom it may concern:*

Be it known that I, DANIEL W. MCLEAN, subject of the King of Great Britain, residing at Highland Park, county of Wayne, State of Michigan, have invented a certain new and useful Improvement in Car-Moving Devices, and declare the following to be a full, clear, and exact description of the same, such as will enable others skilled in the art to which it pertains to make and use the same, reference being had to the accompanying drawings, which form a part of this specification.

My invention relates to car moving devices operated by means of a hand lever. The object of my invention is to provide a car moving device operated by means of a hand lever, whereby downward pressure upon the hand lever not only brings lifting pressure to bear upon the periphery of the car wheel but at the same time securely clamps the device to the rail so as to afford a stationary non-slipping fulcrum for such lever to act on.

A further object of my invention is to provide a device which will apply pressure to the periphery of the car wheel at a point removed as far as possible from the perpendicular axis of the wheel so as to bring to bear the greatest possible leverage upon the wheel. In all previous devices intended to perform like work, such as the long used pinch bar, or its various modifications, the point of pressure against the periphery of the wheel was at a point well in under the wheel. The leverage developed in the wheel for a constant amount of pressure is considerably greater in my device than would be the case if the pressure were applied to the wheel at its point of contact with the downwardly inclined forward end of forward member, as would be the case if the common form of pinch bar were used.

In the accompanying drawing:

Figure 1 shows the device in relation to a car wheel.

Fig. 2 shows a side view, the device being attached to the rail.

Fig. 3 is a vertical sectional view taken on line 3—3 of Fig. 2.

Fig. 4 is a top plan view of the lower longitudinal members of the device showing the couplings and bolts as having been removed.

Fig. 5 is a top plan view of member 3 shown in side elevation in Fig. 2.

Similar numbers refer to similar parts.

Figure 6:
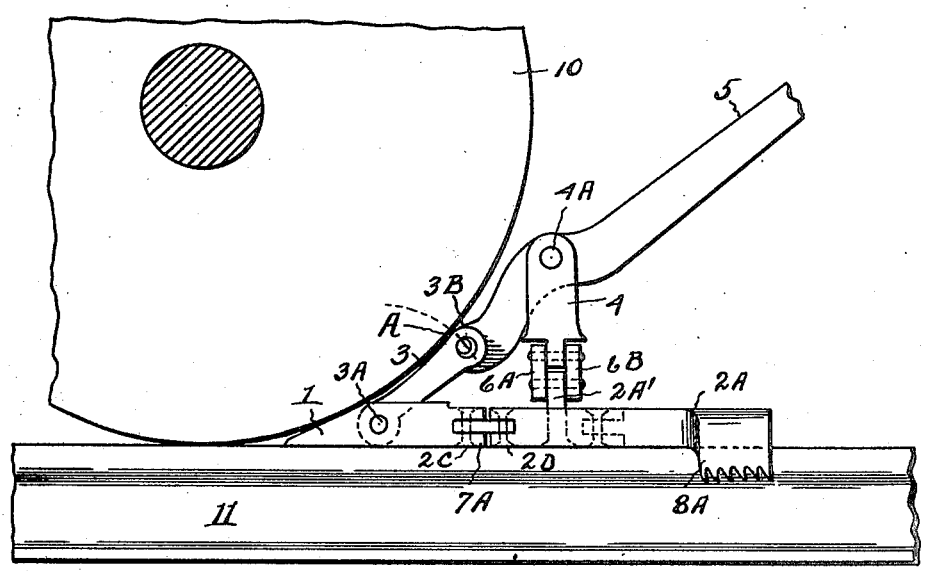
Fig. 6 is a side view showing the application of the car mover to the car wheel at the beginning of the forward impulse.
Figure 7:
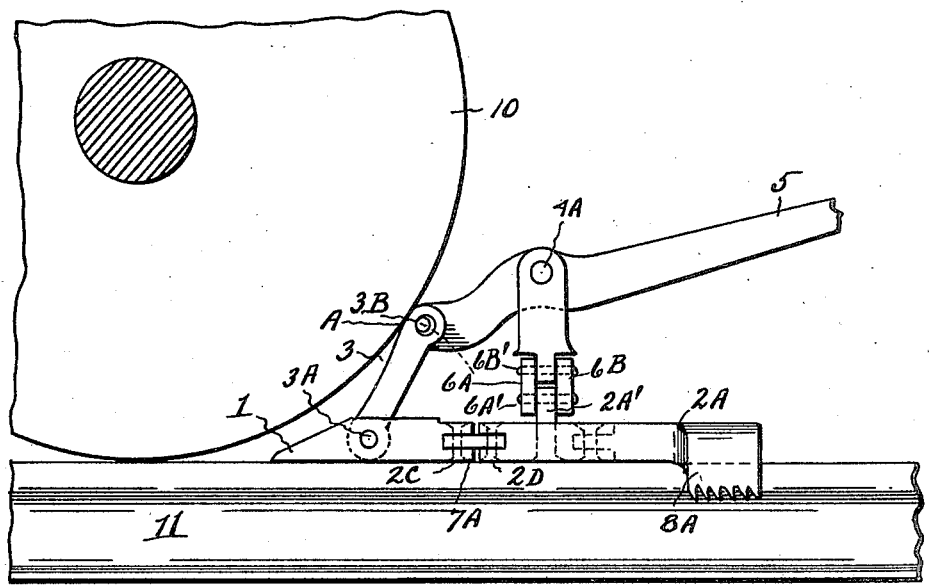
Fig. 7 is a like view showing the application of the car mover to the car wheel at the completion of the forward impulse.

My device is shown in operable contact with a car wheel in Fig. 1. The point of pressure against the periphery of the wheel is indicated at A. Forward member 1, which is shoved well in underneath the wheel, and has a downwardly inclined face to permit its insertion well underneath the wheel, is loosely linked to two rearward members 2A and 2B, by means of links 7A and 7B as shown in Fig. 4. Said links are tongued in grooves in the ends of said forward member 1 and rearward members 2A and 2B, and pivotally fastened thereto by means of rivets or bolts as indicated at 2C and 2D.

The aforementioned rearward members 2A and 2B are shown as pivoted together by means of a bolt or rivet pin 9. The rearward ends of said rearward members 2A and 2B are shown as provided with downwardly projecting clamps, preferably roughened on their inner surfaces to frictionally grip the sides of the rail, as shown in Fig. 3. The lower edges of said clamping projections are preferably serrated, Fig. 2, which would serve a useful purpose, in case, as frequently occurs at crossings, wooden crossing blocks were placed between the rails, the upper surfaces of said blocks coming almost flush with the top of the rail, in such case the serrated edges would grip the crossing blocks, preventing a backward slipping of the device when downward pressure is applied to the hand lever. Said rearward members 2A and 2B are provided with lugs or short standards 2A' and 2B' respectively screwed therein. Said short standards 2A' and 2B' support by means of a double toggle, fulcrum member 4. Said double toggle consists of two pairs of links, numbered as 6A, 6B, 6C and 6D (6D not being shown in the drawings, but forming the other and opposite link of the pair of which 6C is a member). Said fulcrum member 4 is pivotally fastened by means of a bolt or connecting pin 6B' to the inner ends of said links constituting the double toggle, as shown in Fig. 3. The outer ends of said links forming the double toggle, are pivotally fastened as shown in Figs. 2 and 3 to said short standards 2A' and 2B'.

The device is operated by means of hand lever 5, which is pivotally supported by fulcrum member 4, with which it is connected by means of a connecting pin or bolt 4A as shown in Fig. 3. The forward end of said lever 5 is connected with the forward member 1 of the device, by means of a connecting link 3, which is pivotally fastened by a bolt or pin 3A to said forward member 1, as shown in Fig. 2, and the upper end of said connecting link being pivotally fastened by means of a bolt or pin 3B to the forward end of said hand lever 5.

The method of operation is as follows: The device being placed on the rail, indicated at 11, the forward member 1 is inserted well under car wheel 10, the handle 5 being in an elevated position. By virtue of handle 5 being well elevated, the inner ends of said connecting links constituting the double toggle are raised well up. It will be noted that the short standards 2A' and 2B' to which such double toggle is fastened are somewhat forward of the point 9 where said rearward members are joined together; therefore a lifting of said toggle links will draw the forward ends of said rearward members 2A and 2B toward each other, spreading the rearward ends of the same members apart and allowing the downwardly projecting clamps on said rearward ends to fit down on either side of the rail. When pressure is first applied to said hand lever 5, the toggle links are flattened out by the downward pressure of said fulcrum member 4, the forward ends of said rearward members thereby being forced away from each other, bringing the rearward ends with their downwardly projecting clamps toward each other and clamping them against the side of the rail. This affords a permanent non-slipping fulcrum for the hand lever to work on. Continued downward pressure on the long arm of the hand lever, with its consequent elevation of the short arm of said lever, forces the upper extremity of the connecting link 3, which is pivoted at 3B to said hand lever, against the periphery of the car wheel at A, rotating the wheel and propelling the car forward. The device is loosened from the rail by elevating the handle 5; and it can then be pushed forward, preferably with the foot, and the operation repeated.

It will be seen that this device possesses two distinct advantages over apparatus previously devised to perform like work. Firstly, that the downward motion of the hand lever which brings pressure to bear upon the car wheel, also locks the device upon the rail thereby preventing any backward slipping of the device thus maintaining a stationary fulcrum on which the lever can operate. Secondly, that the pressure point upon the periphery of the wheel, is no longer a point almost directly underneath the perpendicular axis of the wheel, but the pressure is applied at a point sufficiently removed from the perpendicular axis of the wheel to secure the greatest leverage, thus enabling the same amount of work to be performed with the expenditure of but a fraction of the effort necessary when the point of application of pressure to the periphery of the car wheel more nearly approaches the projection of the perpendicular axis on the lower surface of the wheel.

What I claim is:

1. In a car mover, in combination with two pivotally joined gripping members of a forward member loosely connected therewith and adapted to impinge underneath the car wheel, a bearing member pivoted for rotation in said forward member well rearward of the point where said forward member impinges underneath the car wheel, a hand lever fulcrumed above said gripping members and loosely connected with said bearing member in such a manner that said bearing member is brought to exert a forward pressure against said car wheel well rearward and above the point where it is pivoted to said forward member, a double toggle connecting said gripping members and supporting said hand lever.

2. In a car moving device, in combination with a hand lever, a double toggle fulcrum supporting said hand lever and connecting two pivotally joined gripping members downwardly projecting extensions on said gripping members provided with downwardly and slightly-inwardly inclined gripping teeth, a forward member loosely connected to said gripping members and adapted to impinge underneath the car wheel, a bearing member pivotally carried by said forward member well rearward of the point where it impinges on the wheel, and loosely connected to said hand lever in such a manner that it exerts forward pressure against said car wheel well rearward and above the point where it is pivotally connected with said forward member upon downward actuation of said hand lever.

3. In a car moving device, in combination with two pivotally joined gripping members adapted to grip opposite sides of a railway rail, a double toggle connecting the same forward of their pivotal point, a hand lever supported by said double toggle which acts as a fulcrum therefor, a forward member loosely connected to said gripping members and adapted to impinge underneath the car wheel, a bearing member loosely carried at the forward end of said hand lever whose pivotal axis is a point on said forward member rearward of where it impinges underneath the wheel.

4. In a car moving device, in combination with two pivotally connected gripping members adapted to grip opposite sides of a railway rail, a hand lever fulcrumed above and forward of their pivotal point, means joining said gripping members together forward of their pivotal axis, said means supporting said hand lever so adapted that downward pressure thereon operates laterally said gripping members, a bearing member carried at the forward end of said hand lever, a forward member pivotally carried at the lower end of said bearing member rearwardly loosely connected to said gripping members and adapted to impinge underneath the car wheel.

In testimony whereof I sign this specification.

DANIEL W. McLEAN.